A. P. LUNDIN.
DEVICE FOR HOISTING AND LOWERING LIFE BOATS.
APPLICATION FILED MAY 13, 1909.
1,025,818.
Patented May 7, 1912.
8 SHEETS—SHEET 2.
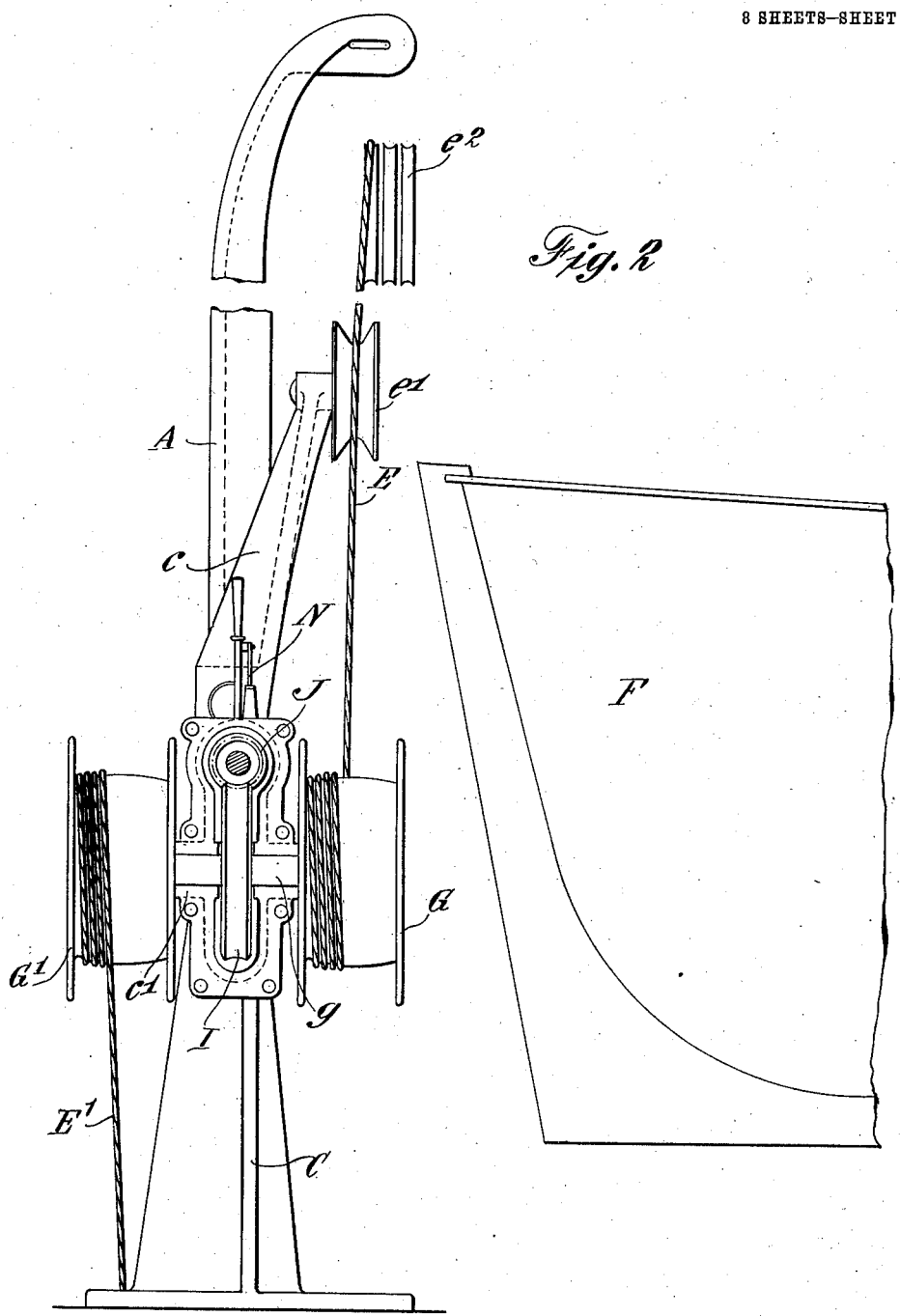

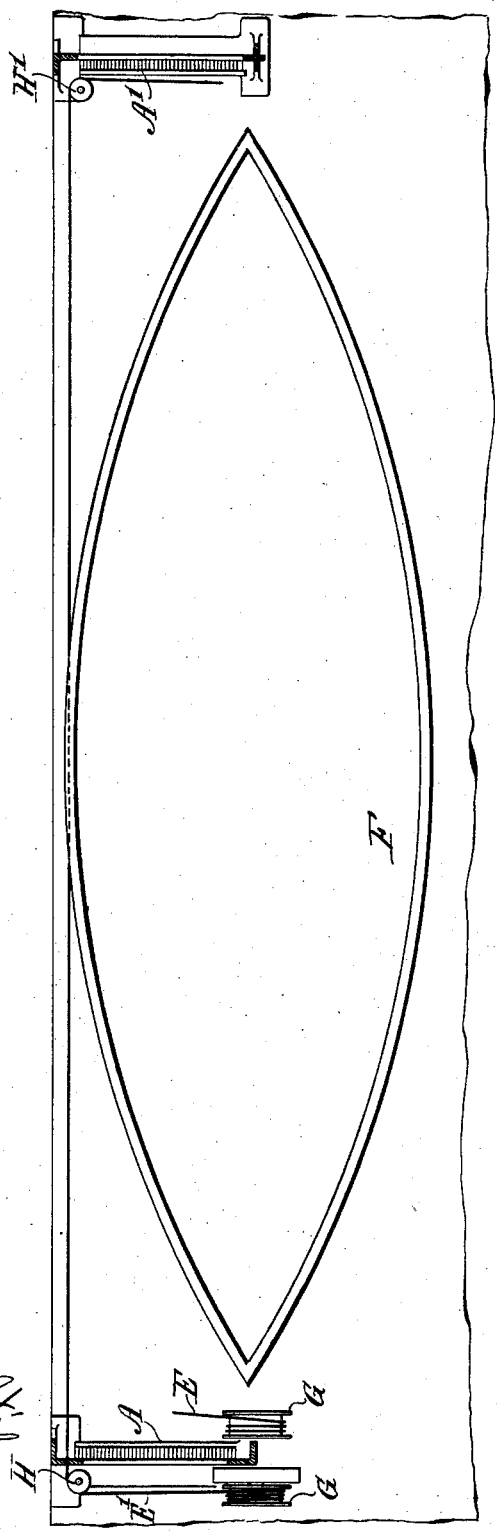

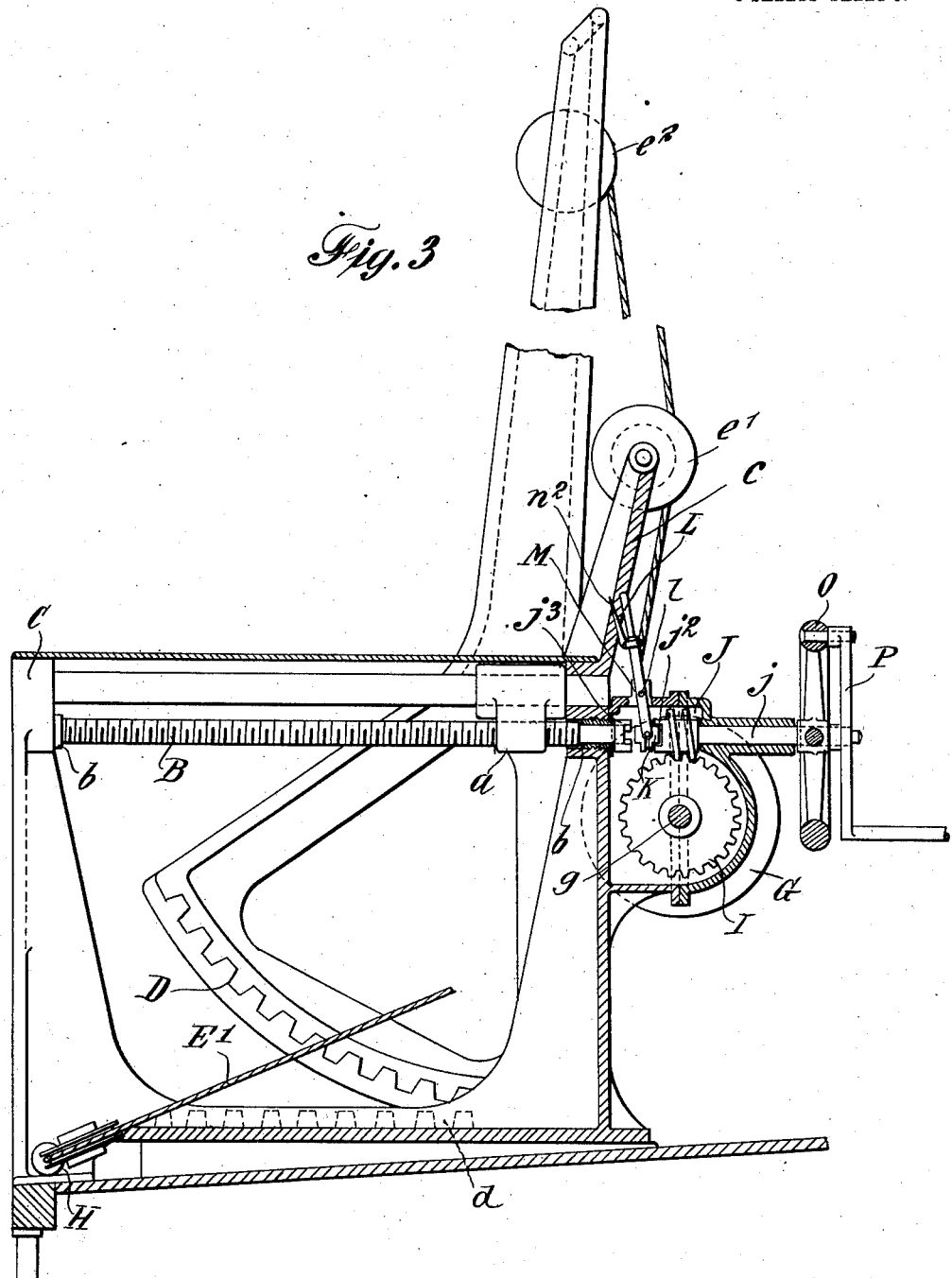

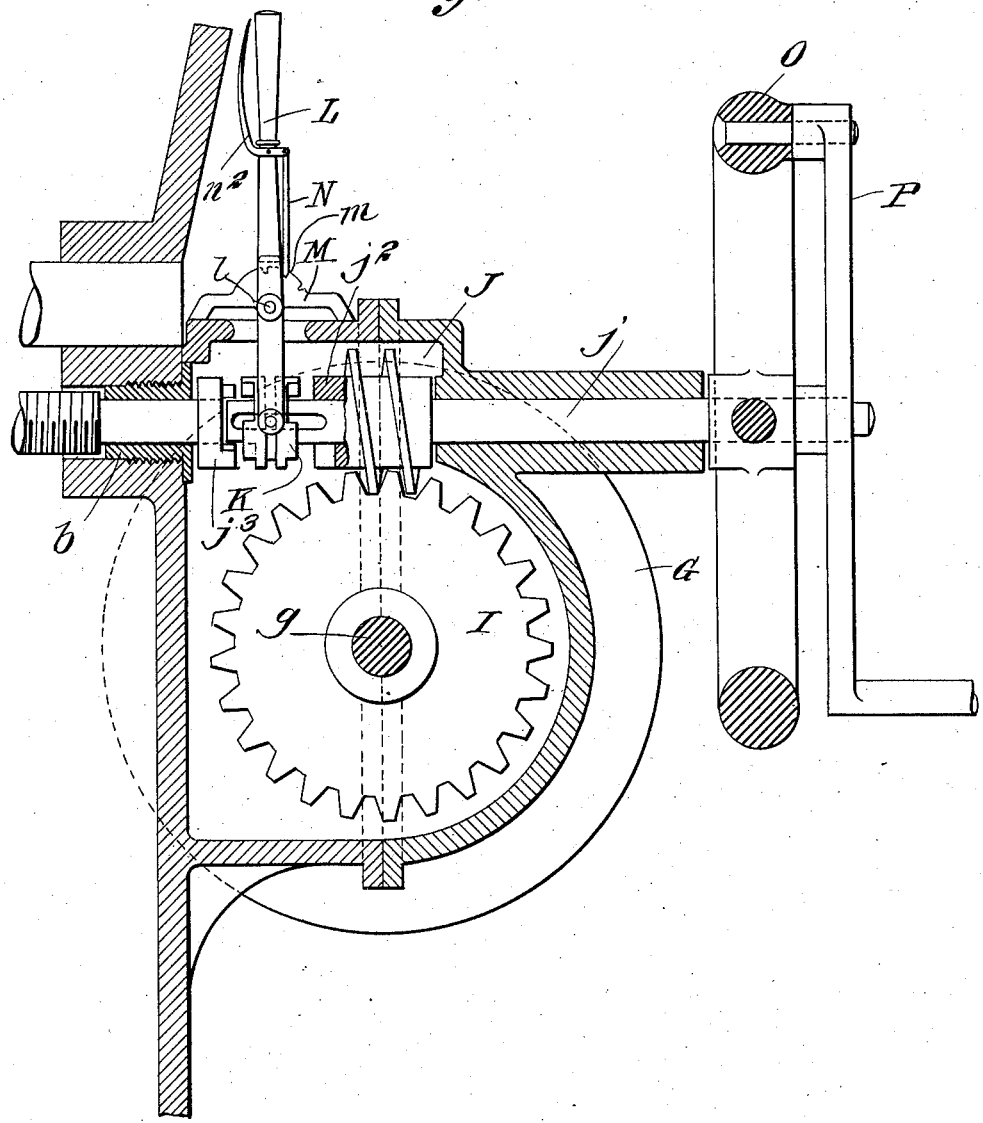

A. P. LUNDIN.
DEVICE FOR HOISTING AND LOWERING LIFE BOATS.
APPLICATION FILED MAY 13, 1909.
1,025,818.
Patented May 7, 1912.
8 SHEETS—SHEET 5.
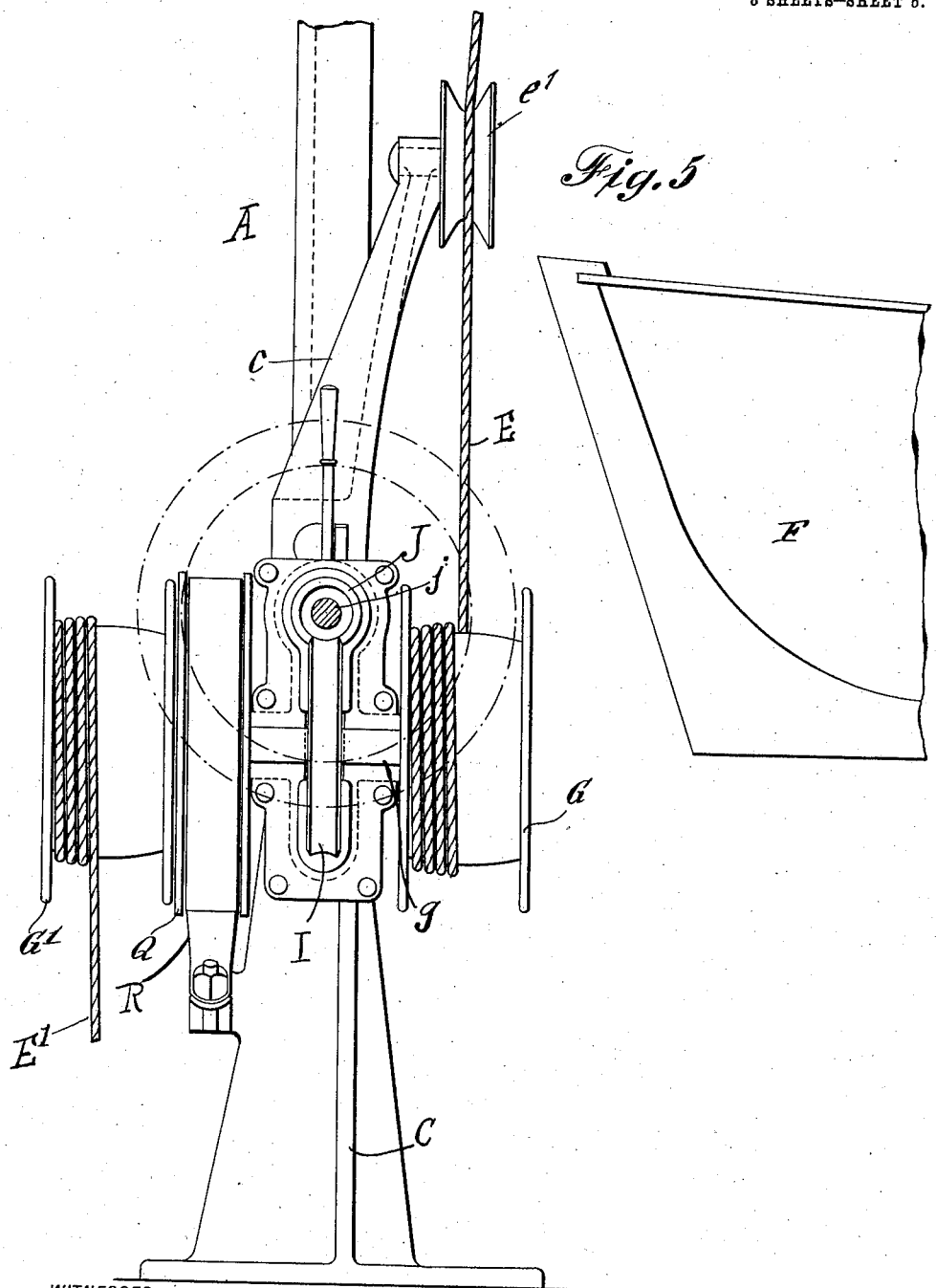
WITNESSES
INVENTOR
BY
ATTORNEYS

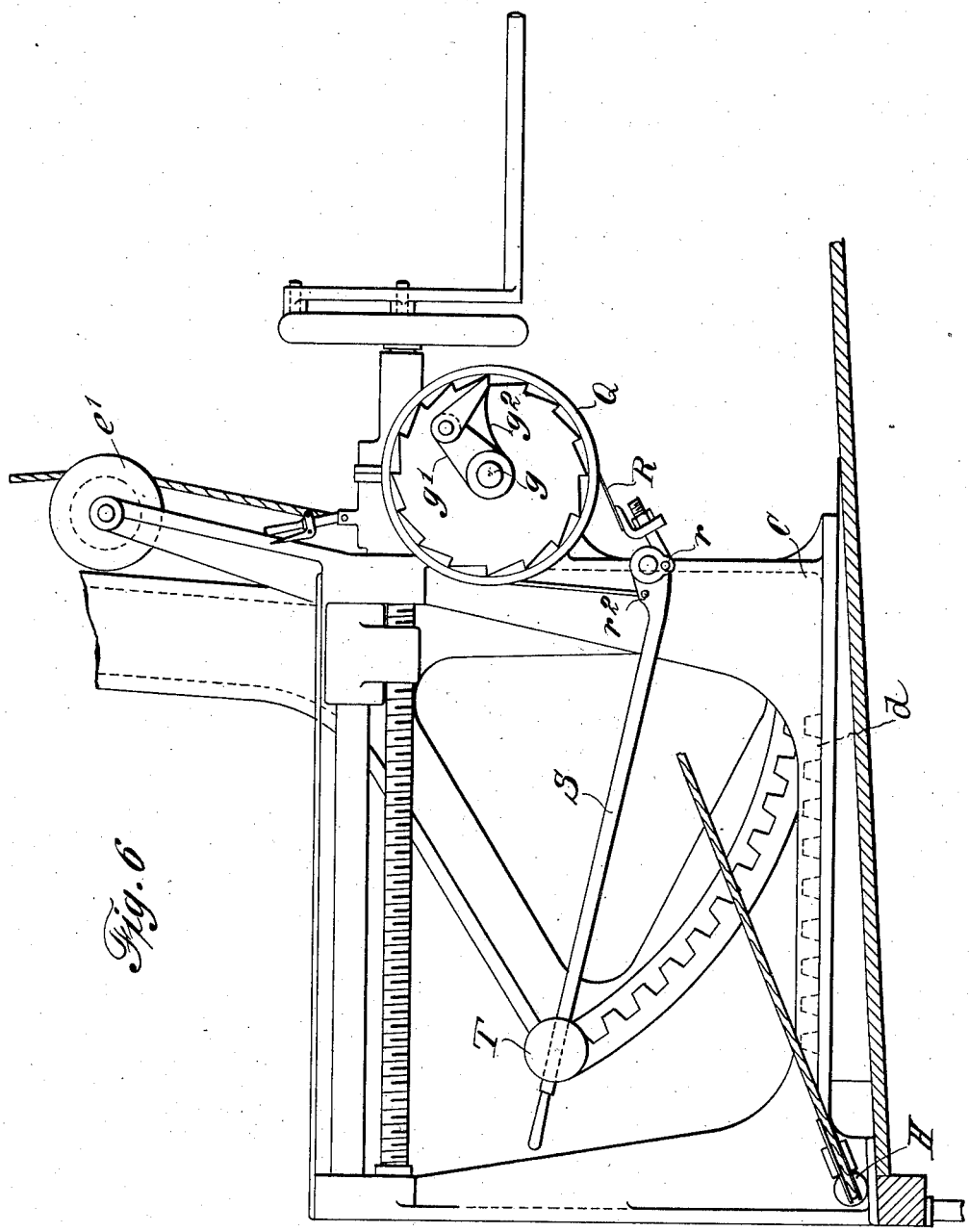

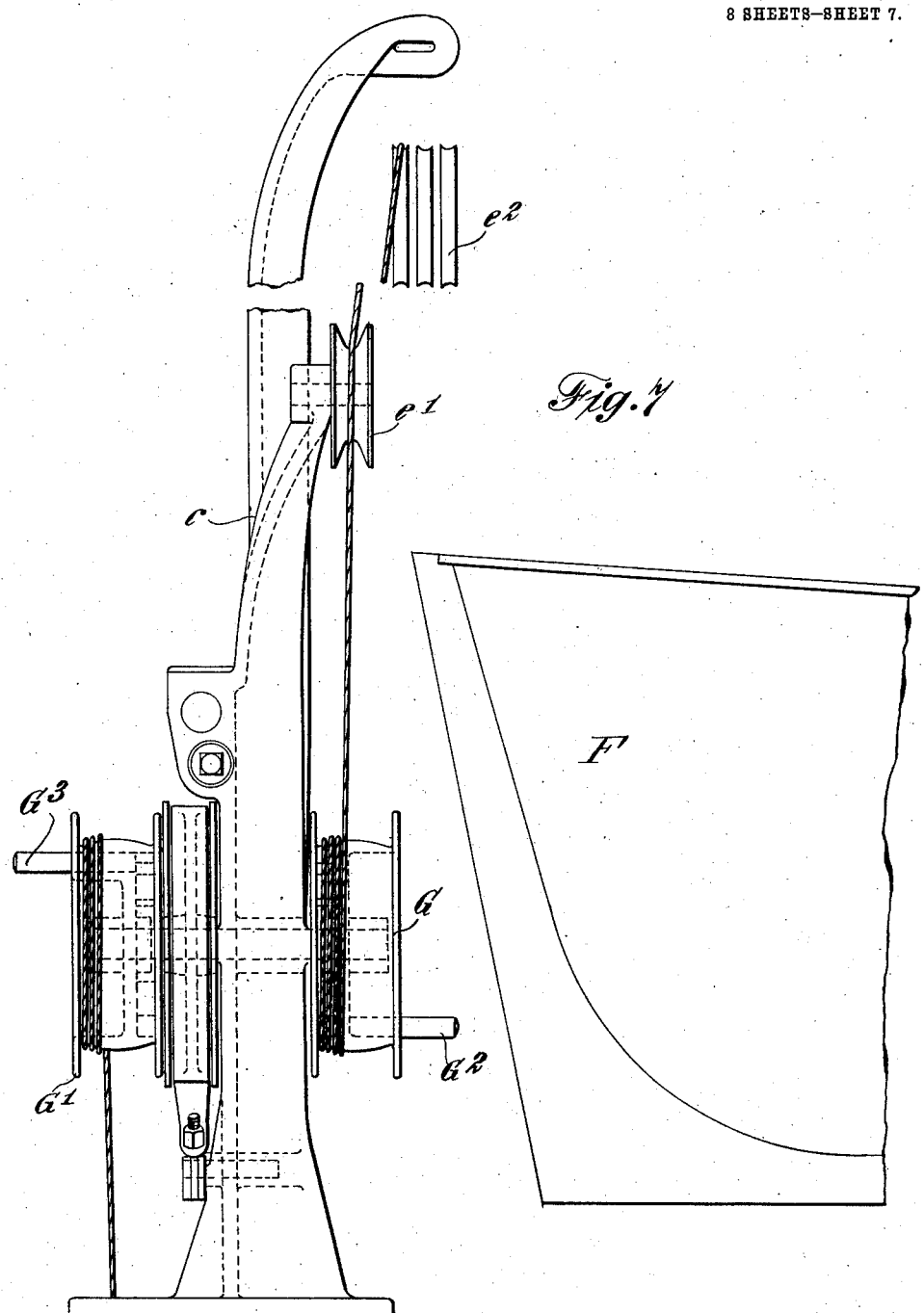

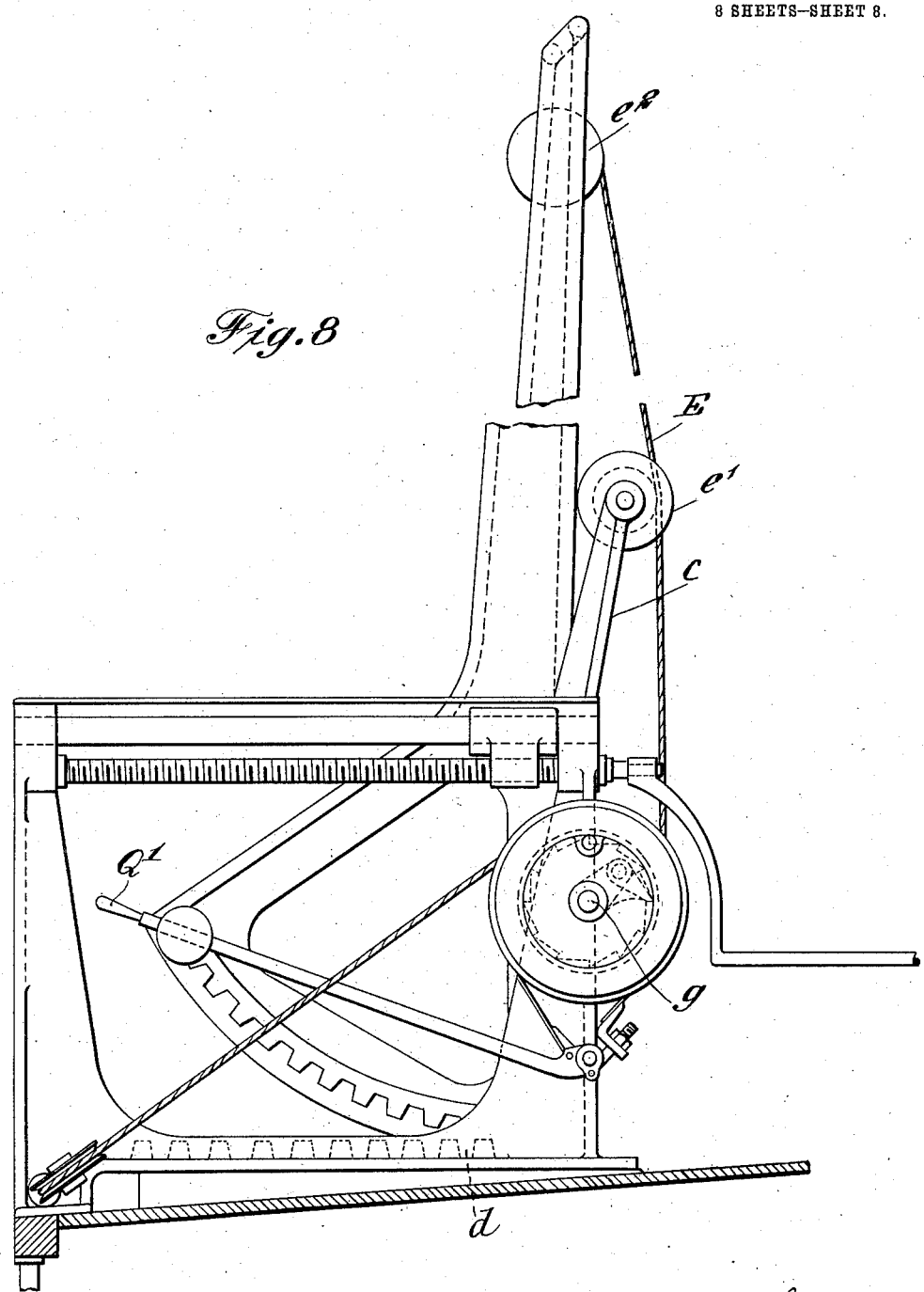

UNITED STATES PATENT OFFICE.

ANDREAS P. LUNDIN, OF NEW YORK, N. Y., ASSIGNOR, BY MESNE ASSIGNMENTS, TO ASTOR TRUST COMPANY, TRUSTEE, A CORPORATION OF NEW YORK.

DEVICE FOR HOISTING AND LOWERING LIFE-BOATS.

1,025,818.      Specification of Letters Patent.      Patented May 7, 1912.

Application filed May 13, 1909. Serial No. 495,797.

*To all whom it may concern:*

Be it known that I, ANDREAS P. LUNDIN, a citizen of the United States, and residing in the borough of Manhattan, city, county, and State of New York, have invented certain new and useful Improvements in Devices for Hoisting and Lowering Life-Boats, of which the following is a full, clear, and exact description.

This invention relates to devices for hoisting and lowering lifeboats.

By the use of my invention, both ends of the lifeboat may be lowered evenly; the deck between the davits is unobstructed by mechanism and deck space thereby economized; the davits may be swung and the hoisting and lowering accomplished by the same operating mechanism; the launching of the lifeboat may be rapidly and safely accomplished and the devices used are inexpensive.

In the accompanying drawings, Figure 1 is a diagrammatic view of the arrangement of the davits and falls; Fig. 2 is an elevation partly in section of the davits, upon the frame of which the hoisting and lowering mechanism is mounted; Fig. 3 is also an elevation, partly in section, the plane of the section being on the line 3—3 of Fig. 2; Fig. 4 is a detail of the clutch as shown in Figs. 2 and 3; Figs. 5 and 6 are views similar to Figs. 2 and 3 of a modified form of the hoisting and lowering mechanism; and Figs. 7 and 8 are elevations taken at right-angles to each other of another modified form.

While my invention may be used in conjunction with any form of davit, it is designed to be used preferably with davits illustrated in Patents No. 680,823 and No. 711,749 granted respectively on August 20, 1901 and October 22, 1902 to Axel Welin.

Referring now to these drawings, in which similar reference characters designate corresponding parts, A, A' (Fig. 1) indicate a pair of davits, each of which is pivotally connected to a nut $a$ supported to travel on the screw B, supported to turn but not to move longitudinally in bearings $b$ on the supporting frame C. The lower end of each davit is in the form of a toothed quadrant D which coöperates with the rack $d$ shown in dotted lines. (See particularly Figs. 3, 6 and 8.) The mechanism so far described forms no part of my present invention and is fully described in the patents referred to.

E, E' indicate ropes wound upon drums G, G' for hoisting and lowering the boat F. The rope E runs from the winding drum G directly up over the pulley $e'$ journaled on an arm $c$ on the left hand davit frame and also over the pulley $e^2$ at the upper end of the davit, and thence to the boat. The rope E' runs from the winding drum G' downwardly and over pulley H at the lower outboard end of said davit frame; thence along the outboard edge of the deck of the vessel to a pulley H' at the lower outboard end of the right-hand davit frame, and thence up over pulleys in the same manner as above described to the top of the davit A' and to the other end of the boat.

Referring now to the mechanism shown in Figs. 2, 3 and 4, the drums G, G' are fast on the shaft $g$ supported to turn in bearings $c'$ in the davit frame C. A worm wheel I is also fast on the shaft $g$ and meshes with a worm J loosely mounted on the operating shaft $j$ supported in suitable bearings in the said davit frame at one end and bearing at the other end in a suitable bearing provided therefor in the shaft carrying the screw B. The worm J terminates in a counterpart box $j^2$ in the rear of a similar counterpart box $j^3$ on the screw shaft B, and each of such boxes is provided with the usual projections and interdental spaces. Intermediate the counterpart boxes $j^2$ and $j^3$ and slidingly secured to the shaft $j$ in any suitable manner is a double clutch or clutch box K, the side or coupling faces of which are also provided with projections and interdental spaces corresponding to those of the boxes $j^2$ and $j^3$ and adapted to coact therewith. A lever L pivoted at $l$ to a bridge-piece M is adapted to shift the clutch or clutch box K into engagement with either counterpart box as desired. A locking rod N coöperating with notches $m$ in the bridgepiece M serves to lock the clutch box into engagement with either of the counterpart boxes above described. The rod N is provided with a hand lever $n^2$ adapted upon manipulation to withdraw the locking rod N to permit the lever to be moved. The outer end of the shaft $j$ is adapted to receive a fly wheel O and crank handle P.

Assuming the parts to be in the position shown, if it is desired to swing the boat out, the clutch is thrown into the box on the screw shaft B and the davit swung outboard by manipulation of the crank handle or fly wheel, the opposite davit being at the same time directly actuated by a crank fixed to its screw shaft B. To lower the boat the clutch is thrown back into the box $j^2$, the handle P removed, and the fly wheel O given a slight impulse to start the lowering process, the pitch of the worm $j$ being just sufficient to lock with the pinion when at rest. When it is desired to stop the lowering process all that will be necessary is to check the momentum of the fly wheel, which may be done by hand with little effort. It is obvious that the boat may be hoisted and the davit and boat swung inboard by the reverse operation of the mechanism.

If desired, an electric motor or other suitable operating power may be applied to the shaft $j$, in which event a friction band or other suitable means for checking the rotation of the shaft when lowering would preferably be employed.

In some cases it may be desirable to use the operating shaft $j$ for the swinging and hoisting operations only, and to use brake-drum mechanism or other suitable means for lowering the boat, and in Figs. 5 and 6, I have shown such a modified construction. In this construction, the rope drums are keyed to the shaft $g$ and a brake drum Q is loosely mounted thereon. A pawl $g'$ is keyed to the shaft $g$ and coöperates with ratchet teeth carried on the inner rim of the brake drum, so as to permit free relative movement between the shaft and brake drum in one direction only, and as shown, in the direction to wind the ropes upon the drums, and during such winding of the ropes upon the drums to hoist the boat, the pawl $g'$ will simply click over the ratchet teeth, but will prevent relative movement in the opposite direction or in the direction to lower the boat. The pawl $g'$ is held in engagement with the ratchet teeth in any suitable manner, such as by the spring $g^2$. A brake strap R to coöperate with the brake drum is connected at one end to a pin $r$ on the frame C, and its other end is connected as at $r^2$ to a lever S which is pivoted at one end to the frame C and as shown to the pin $r$. The lever S is provided with a weight T between its ends which normally operates to depress the lever and hold the brake strap in close contact with the brake drum and prevent the latter from rotating, and consequently will prevent the shaft $g$ and rope drums G, G' keyed thereto from rotating to unwind the ropes and lower the boat, unless the said lever R is lifted. In other respects the mechanism is as above described with relation to Figs. 2 and 3, except that the pitch of the worm J and the teeth of the gear in this construction will be such as to afford substantially no resistance to the lowering of the boat, when the lever is lifted to relieve the friction of the brake strap. When, therefore, it is desired to lower the boat after it is swung out, it is only necessary to lift the lever R to relieve the friction between the brake drum and the brake strap, and the brake drum Q, rope drums, G, G', worm wheel I and worm J will then all revolve together,—the weight of the boat acting to unwind the ropes from the drums G, G'. The clutch is preferably kept out of engagement with the counterpart box of the worm J during the lowering operation, so that the operating shaft and fly wheel will not rotate.

Under some conditions, it may be desirable to entirely omit the worm mechanism for interchangeably operating the screw and hoisting drums and to lower the boat by means of the brake drum mechanism similarly to that just described in reference to Figs. 5 and 6, and in Figs. 7 and 8 I have shown such a construction. In this construction the brake drum is keyed to the shaft $g$ and the rope drums are loosely mounted thereon, each rope drum having a ratchet and pawl connection, similar to that above described, with the shaft. A brake strap is pivoted to a weighted lever to coöperate with the brake drum in substantially the same way as above described in relation to Figs. 5 and 6. The rope drums, being loosely mounted on the shaft, may be operated independently of the brake drum and of each other to take up any slack of either rope on its rope drum. For this purpose, the rope drums, as shown, are provided with handles $G^2$, $G^3$ to wind up such slack. When the handles $G^2$, $G^3$, are not in use to wind up slacks, they may be pushed inward toward the center of the drum and be out of the way. In this construction it is intended that the davit will be swung out by the use of the screw B turned by the handle B' and the boat will be lowered by simply lifting the weighted lever Q'. It is intended that the hoisting shall be done by running the slack of the ropes over a steam or electric winch or other suitable device.

When the lowering devices above set forth are used in combination with the vertically swinging davits illustrated herein and also described in the patents to Axel Welin hereinbefore enumerated, such lowering devices may be employed to ease up the strain of lifting the boats from the chocks. In other words, when such davits are being swung out, the lowering away may in many cases be commenced and continued while such operation is in progress, thus causing a simultaneous swinging out and lowering of the boat. The pull on the fall caused by the easing up on the brake drum during the operation of swinging the davit will materially assist and make easier the swinging of such davit.

I claim:

1. The combination with a pair of vertically swinging davits, each mounted in its own frame, the two frames being unconnected mechanically, of two drums mounted on a common shaft supported in the frame of one of such davits, ropes on both drums, means for carrying the ropes from one drum upwardly and over the top of one davit to one end of the lifeboat and the rope from the other drum downwardly and along the outboard edge of the deck to the other davit and the other end of the lifeboat, and actuating means adapted to interchangeably swing the davit and rotate the drums.

2. The combination with a pair of vertically swinging davits each mounted in its own frame, the two frames being unconnected mechanically, of two drums mounted on a common shaft supported in the frame of one of such davits, ropes on both drums, means for carrying the ropes from one drum upwardly and over the top of one davit to one end of the lifeboat and the rope from the other drum downwardly and along the outboard edge of the deck to the other davit and the other end of the lifeboat, means for swinging the davit, means for rotating the rope drums to hoist and lower the boat, and a common power shaft for interchangeably actuating the davit-swinging means and drum-rotating means.

3. The combination with a pair of vertically swinging davits, each mounted in a suitable frame and provided with an actuating screw suitably mounted in such frame to swing the davit vertically, of two rope drums mounted on a common shaft in the frame of one of such davits, ropes on both drums, a plurality of pulleys carrying the rope from one drum to the top of one davit and to one end of the boat and the rope from the other drum to the top of the opposite davit and to the opposite end of the boat; a brake drum mounted on said common shaft; means adapted to permit relative movement in one direction between the brake drums and the winding drums and to lock the same together in the opposite direction; a brake-band for frictionally engaging the brake drum and a pivoted and weighted lever connected to the band to normally retain the same in contact with the brake drum to prevent rotation of the latter.

In witness whereof, I have signed my name to the foregoing specification in the presence of two subscribing witnesses.

ANDREAS P. LUNDIN.

Witnesses:
 ANNA S. BROMBERG,
 ROSE V. FINN.

---

Copies of this patent may be obtained for five cents each, by addressing the "Commissioner of Patents, Washington, D. C."